(12) United States Patent
McPhie et al.

(10) Patent No.: US 9,779,285 B2
(45) Date of Patent: *Oct. 3, 2017

(54) FACE TEMPLATE BALANCING

(71) Applicant: Google Inc., Mountain View, CA (US)

(72) Inventors: Jonathan McPhie, Mountain View, CA (US); Hartwig Adam, Marina del Rey, CA (US); Dan Fredinburg, Mountain View, CA (US); Alexei Masterov, Mountain View, CA (US)

(73) Assignee: Google Inc., Mountain View, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/287,792

(22) Filed: Oct. 7, 2016

(65) Prior Publication Data

US 2017/0091531 A1    Mar. 30, 2017

Related U.S. Application Data

(63) Continuation of application No. 14/334,354, filed on Jul. 17, 2014, now Pat. No. 9,465,977.

(60) Provisional application No. 61/856,609, filed on Jul. 19, 2013.

(51) Int. Cl.
*G06K 9/00* (2006.01)
(52) U.S. Cl.
CPC ..... *G06K 9/00241* (2013.01); *G06K 9/00288* (2013.01)
(58) Field of Classification Search
CPC ........... G06K 9/00241; G06K 9/00288; G06K 9/6254; G06K 9/6255
USPC ......................................................... 382/118
See application file for complete search history.

(56) References Cited

U.S. PATENT DOCUMENTS

| 7,856,137 | B2 | 12/2010 | Yonezawa et al. |
| 2007/0165936 | A1 | 7/2007 | Yonezawa et al. |
| 2008/0050022 | A1 | 2/2008 | Okada et al. |
| 2008/0189609 | A1 | 8/2008 | Larson et al. |
| 2009/0185723 | A1 | 7/2009 | Kurtz et al. |
| 2010/0158325 | A1 | 6/2010 | Piramuthu et al. |
| 2011/0044512 | A1 | 2/2011 | Bambha et al. |
| 2013/0247175 | A1* | 9/2013 | Nechyba ............... G06F 21/32 726/19 |

OTHER PUBLICATIONS

International Bureau of WIPO, International Preliminary Report on Patentability for International Patent Application No. PCT/US2014/047094, Jan. 19, 2016, 5 pages.
USPTO, Notice of Allowance for U.S. Appl. No. 14/334,354, Jun. 15, 2016, 10 pages.
USPTO, Non-final Office Action for U.S. Appl. No. 14/334,354, Feb. 3, 2016, 12 pages.

(Continued)

*Primary Examiner* — Manuchehr Rahmjoo
(74) *Attorney, Agent, or Firm* — IP Spring (57) ABSTRACT

Implementations generally relate to face template balancing. In some implementations, a method includes generating face templates corresponding to respective images. The method also includes matching the images to a user based on the face templates. The method also includes receiving a determination that one or more matched images are mismatched images. The method also includes flagging one or more face templates corresponding to the one or more mismatched images as negative face templates.

20 Claims, 3 Drawing Sheets

(56) References Cited

OTHER PUBLICATIONS

USPTO, International Search Report for International Patent Application No. PCT/US2014/047094, Mar. 11, 2015, 2 pages.
USPTO, Written Opinion for International Patent Application No. PCT/US2014/047094, Mar. 11, 2015, 4 pages.

* cited by examiner

FACE TEMPLATE BALANCING

CROSS REFERENCE TO RELATED APPLICATIONS

The present application is a continuation of U.S. patent application Ser. No. 14/334,354, filed Jul. 17, 2014 and titled FACE TEMPLATE BALANCING, which claims priority to U.S. Provisional Patent Application No. 61/856,609, filed Jul. 19, 2013 and titled FACE TEMPLATE BALANCING, both of which are hereby incorporated by reference in their entirety.

BACKGROUND

Social network systems often enable users to share photos with each other. For example, users can share photos with friends and family, which provides enjoyable and bonding experiences among users of social network systems. Social network systems also enable users to tag photos such that people in photos are labeled with their respective names.

SUMMARY

Implementations generally relate to face template balancing. In some implementations, a method includes generating face templates corresponding to respective images. The method also includes matching the images to a user based on the face templates. The method also includes receiving a determination that one or more matched images are mismatched images. The method also includes flagging one or more face templates corresponding to the one or more mismatched images as negative face templates.

With further regard to the method, in some implementations, the receiving of the determination that one or more matched images are mismatched images is based on one or more user indications. In some implementations, the receiving of the determination that one or more matched images are mismatched images includes: providing the matched images to the user; and receiving one or more indications from the user indicating that one or more of the matched images are mismatched images. In some implementations, the method further includes receiving a determination that one or more matched images are correctly matched images. In some implementations, the method further includes: receiving a determination that one or more matched images are correctly matched images; and flagging one or more face templates corresponding to one or more correctly matched images as positive face templates. In some implementations, the method further includes: receiving a determination that one or more matched images are correctly matched images; flagging one or more face templates corresponding to one or more correctly matched images as positive face templates; and generating a face model based on one or more positive face templates. In some implementations, the method further includes receiving a determination that one or more matched images are correctly matched images, where the receiving of the determination that one or more matched images are correctly matched images includes: providing the matched images to the user; and receiving one or more indications from the user indicating that one or more of the matched images are correctly matched images. In some implementations, the method further includes: receiving a determination that one or more matched images are correctly matched images; flagging one or more face templates corresponding to one or more correctly matched images as positive face templates; and determining one or more differentiating characteristics that differentiate at least one negative face template from one or more positive face templates. In some implementations, a negative face template has one or more differentiating characteristics compared to characteristics of one or more positive face templates, and a positive face template is a face template that has been confirmed as corresponding to a correctly matched image.

In some implementations, a method includes generating face templates corresponding to respective images. The method further includes matching the images to a user based on the face templates. The method further includes receiving a determination that one or more matched images are mismatched images. The method further includes flagging one or more face templates corresponding to the one or more mismatched images as negative face templates. The method further includes receiving a determination that one or more matched images are correctly matched images. The method further includes flagging one or more face templates corresponding to one or more correctly matched images as positive face templates.

With further regard to the method, in some implementations, the receiving of the determination that one or more matched images are mismatched images is based on one or more user indications. In some implementations, the receiving of the determination that one or more matched images are mismatched images includes: providing the matched images to the user; and receiving one or more indications from the user indicating that one or more of the matched images are mismatched images. In some implementations, the method further includes receiving a determination that one or more matched images are correctly matched images, where the receiving of the determination that one or more matched images are correctly matched images includes: providing the matched images to the user; and receiving one or more indications from the user indicating that one or more of the matched images are correctly matched images.

In some implementations, a system includes one or more processors, and logic encoded in one or more tangible media for execution by the one or more processors. When executed, the logic is operable to perform operations including: generating face templates corresponding to respective images; matching the images to a user based on the face templates; receiving a determination that one or more matched images are mismatched images; and flagging one or more face templates corresponding to the one or more mismatched images as negative face templates.

With further regard to the system, in some implementations, the receiving of the determination that one or more matched images are mismatched images is based on one or more user indications. In some implementations, to receive the determination that one or more matched images are mismatched images, the logic when executed is further operable to perform operations including: providing the matched images to the user; and receiving one or more indications from the user indicating that one or more of the matched images are mismatched images. In some implementations, the logic when executed is further operable to perform operations including receiving a determination that one or more matched images are correctly matched images. In some implementations, the logic when executed is further operable to perform operations including: receiving a determination that one or more matched images are correctly matched images; and flagging one or more face templates corresponding to one or more correctly matched images as positive face templates. In some implementations, the logic when executed is further operable to perform operations including: receiving a determination that one or more matched images are correctly matched images; flagging one or more face templates corresponding to one or more correctly matched images as positive face templates; and generating a face model based on one or more positive face templates. In some implementations, the logic when executed is further operable to perform operations including receiving a determination that one or more matched images are correctly matched images, and where, to receive the determination that one or more matched images are correctly matched images, the logic when executed is further operable to perform operations including: providing the matched images to the user; and receiving one or more indications from the user indicating that one or more of the matched images are correctly matched images.

DETAILED DESCRIPTION

Implementations described herein generally relate to face template balancing. In various implementations, a system generates face templates corresponding to respective images. The system then matches the images to a user based on the face templates. The system then receives a determination that one or more matched images are mismatched images and determines one or more images as correctly matched images.

In some implementations, to determine if the matched images are mismatched images or correctly matched images, the system provides the matched images to the user. The system then receives one or more indications from the user indicating whether the matched images are mismatched images or correctly matched images. For example, such indications from a user may indicate that particular images are mismatched/incorrectly tagged, correctly matched/correctly tagged, etc.

The system then flags one or more face templates corresponding to one or more mismatched images as negative face templates. The system also flags one or more face templates corresponding to one or more correctly matched images as positive face templates. The system generates face models based on one or more positive face templates, and may also include one or more negative face templates. In various implementations, the system utilizes the face models to verify future matches of images to the user.

Figure 1:
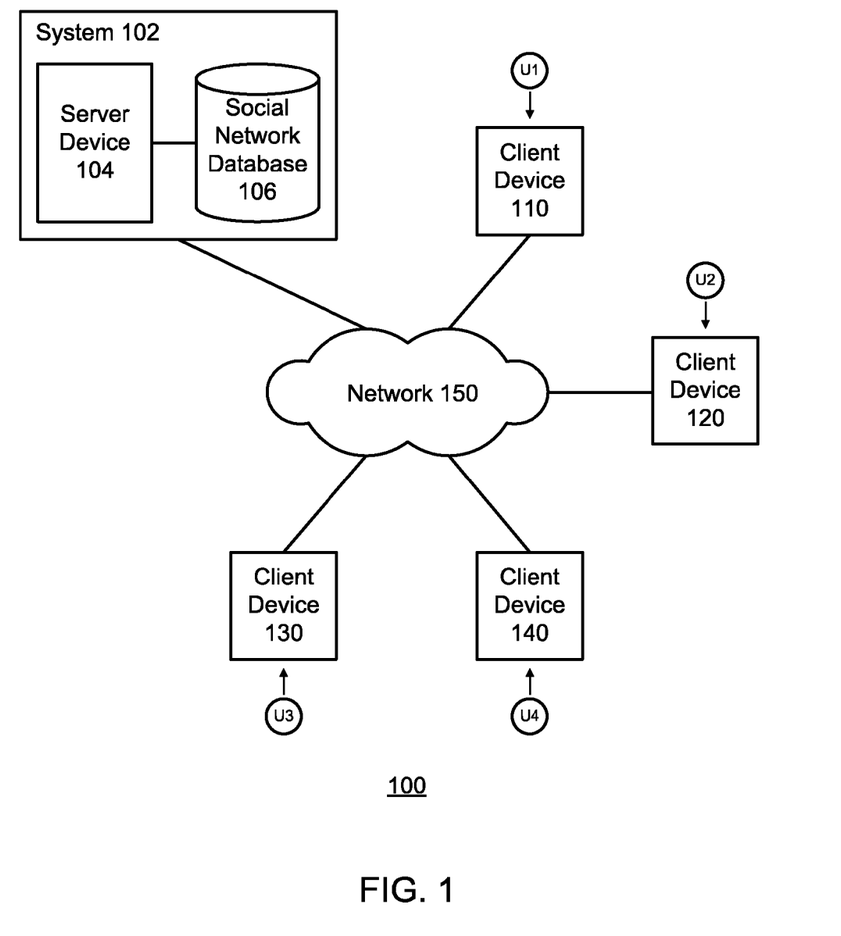
FIG. 1 illustrates a block diagram of an example network environment, which may be used to implement the implementations described herein.

FIG. 1 illustrates a block diagram of an example network environment 100, which may be used to implement the implementations described herein. In some implementations, network environment 100 includes a system 102, which includes a server device 104 and a social network database 106. In various implementations, the term system 102 and phrase "social network system" may be used interchangeably. Network environment 100 also includes client devices 110, 120, 130, and 140, which may communicate with each other via system 102. Network environment 100 also includes a network 150.

For ease of illustration, FIG. 1 shows one block for each of system 102, server device 104, and social network database 106, and shows four blocks for client devices 110, 120, 130, and 140. Blocks 102, 104, and 106 may represent multiple systems, server devices, and social network databases. Also, there may be any number of client devices. In other implementations, network environment 100 may not have all of the components shown and/or may have other elements including other types of elements instead of, or in addition to, those shown herein.

In various implementations, users U1, U2, U3, and U4 may communicate with each other using respective client devices 110, 120, 130, and 140. For example, users U1, U2, U3, and U4 may upload photos to system 102 via respective client devices 110, 120, 130, and 140.

In various implementations, system 102 may utilize a recognition algorithm to detect and recognize a face in one or more photos. Example implementations of recognition algorithms are described in more detail below.

While some implementations are described herein in the context of a social network system, these implementations may apply in contexts other than a social network. For example, implementations may apply locally for an individual user. For example, system 102 may perform the implementations described herein on a stand-alone computer, tablet computer, smartphone, etc.

Figure 2:
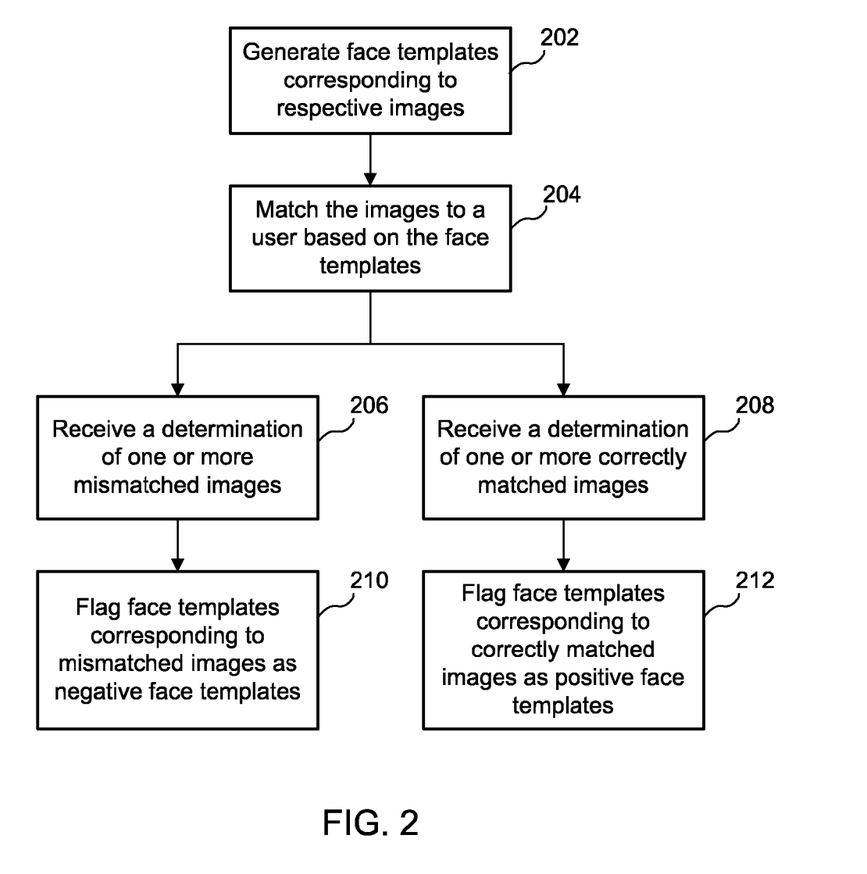
FIG. 2 illustrates an example simplified flow diagram for balancing face templates, according to some implementations.

FIG. 2 illustrates an example simplified flow diagram for balancing face templates, according to some implementations. Referring to both FIGS. 1 and 2, a method is initiated in block 202, where system 102 generates face templates corresponding to respective images.

In block 204, system 102 matches the images to a user based on the face templates. In various implementations, system 102 utilizes a facial recognition algorithm to find images of faces that look similar to other images of faces that have been accurately tagged in the past.

In some implementations, system 102 generates a face template for each image, where each template includes a set of features associated with the image. Thus, a user may have multiple face templates associated with him/her, as system 102 may process multiple images tagged and confirmed to be the user. Note that the phrase "face template" and word "template" are used interchangeably. For each image received, system 102 may locate a face, extract features of the face, and then make a template based on the features in each image containing a face that system 102 examines. In various implementations, system 102 associates one or more templates with each image, where a given template corresponds to a particular image.

Such features describe a given face and include details of elements (e.g., eyes, etc.), location of elements (e.g., a mole on the left check, eye glasses on face, etc.), distance between elements (e.g., distance between the eyes), etc. In various implementations, a template describes a face mathematically. For example, a template may summarize a set a features such that each feature is associated with a value.

System 102 then presents and/or suggests a tag for each image based on matching the image to other images associated with the same tag (e.g., name). System 102 then prompts the user to verify the tag (e.g., "Is this Leo?") for each image. As described in more detail below, if the user confirms a given tag (e.g., "Yes, the tag is correct."), system 102 flags the template as a positive face template, and uses the positive face template to reinforce a model used to identify more faces. Thus, a user will be associated with one face model, which is potentially informed by multiple positive templates that system 102 has positively associated with the user.

In various scenarios, each positive template corresponding to the same face will have differences, yet will still be considered positive templates. For example, the lighting may be different in different images, the face in different images may be turned in different directions, the size of face in different images may differ, etc.

In various implementations, system 102 may generate a face model based on the various positive templates. In some implementations, the face model represents an average of the positive templates. Then, for each new image received, system 102 extracts the features and generates a template for the image. In various implementations, system 102 associates each template to a particular image, whereas the face model is a collection of attribute information from one or more templates.

Referring still to FIG. 2, in block 206, system 102 receives a determination that one or more matched images are mismatched images. In block 208, system 102 receives a determination that one or more matched images are correctly matched images. In various implementations, system 102 may receive the determination that one or more matched images are mismatched images based on one or more user indications. Similarly, system 102 may receive the determination that one or more matched images are correctly matched images based on one or more user indications.

In various implementations, system 102 may receive the determination whether matched images are mismatched images or correctly matched images as follows. System 102 may provide the matched images to the user. For example, system 102 may cause the matched images to be displaced in a user interface. In various implementations, system 102 provides the matched images with tags of the user. For example, a given matched image may have a tag of the user (e.g., a label with the user's name).

System 102 may provide selectable indication buttons that enable the user indicate the accuracy of the tags (e.g., whether the matched images are correct or not). For example, a correctly matched indication button may have a label indicating a correctly matched image where the tag is correct (e.g., "Yes, the tag is correct."). A mismatched indication button may have a label indicating an incorrectly matched image/mismatched image where the tag is incorrect (e.g., "No, the tag is incorrect."). The user may then select the appropriate indication button for each matched image after reading the tag for each matched image. System 102 then receives one or more indications from the user indicating that one or more of the matched images are mismatched images or correctly matched images.

In an example scenario, system 102 may provide one or more images to a first twin. That first twin may determine that a particular image is actually of the second twin. System 102 enables the first twin to indicate that the particular image is mismatched by selecting the appropriate indication button. For example, for a given correctly matched image, the user may select the correctly matched indication button. For a given mismatched image, the user may select the mismatched indication button. In some implementations, for mismatched images, system 102 may enable the user to indicate the correct match. For example, if a given matched image is mismatched (e.g., the image should be matched to the other/second twin), system 102 may enable the user to type in the correct name.

In block 210, system 102 flags one or more face templates corresponding to one or more mismatched images as negative face templates. In block 212, system 102 flags one or more face templates corresponding to one or more correctly matched images as positive face templates. In the example above, system 102 may flag the template corresponding to the mismatched image as a negative template.

In various implementations, system 102 flags the template as a negative facial template in order to inform the model so as to not confuse the face with the original face. In an example scenario, two twins may have the same or similar features except for one or more specific distinguishing features. For example, such distinguishing features may include a birthmark, particular eye wear, particular clothing, etc. Each feature may be unique to the particular person.

System 102 may subsequently use the negative template to enable a facial recognition algorithm to distinguish between similar yet uniquely differentiable images. In various implementations, such a negative template functions as negative feedback to a balancing algorithm in order to discount facial matches that have an overall high degree of similarity but with unique characteristics.

Without the negative template functions (e.g., by using an algorithm that relies only on positive templates for facial recognition), an overall high degree of similarity between images may lead such face recognition algorithms to inaccurately conclude that the faces on images are the same. Such an erroneous decision may be referred to as a false positive. This is because, for a positive template, a unique difference (e.g., a small mole on the cheek, etc.) between the images may appear insignificant compared to the overall high degree of similarity between the images (e.g., smile, skin tone, eyes, etc.). Using negative feedback (e.g., feedback using negative template functions), as described above, reduces the number of false positives when matching images to particular users, and thus improves the overall accuracy of the matching.

In various implementations, the negative face template has at least one differentiating characteristic compared to the positive templates corresponding to correctly matched images. In some implementations, system 102 may compare a given negative face template to known positive face templates in order to determines the one or more differentiating characteristics. As such, if system 102 identifies in a given matched image one or more of the differentiating characteristics associated with a negative face model, system 102 may render that image as mismatched. Similarly, if system 102 identifies in a given matched image differentiating characteristics associated with one or more positive face models, system 102 may render that image as correctly matched.

In various implementations, system 102 flags templates corresponding to correctly matched images as positive templates. System 102 also generates a face model for each user based on the one or more positive face templates, as well as the negative face templates. In various implementations, for each image, system 102 stores any flagged negative templates with the face model for each image. In various implementations, the system utilizes the face models to verify future matches of images to the user.

In various implementations, system 102 determines one or more differentiating characteristics that differentiate at one least negative template from one or more positive templates of the face model. In various implementations, a negative face template has one or more differentiating characteristics compared to the characteristics of one or more positive face templates. As indicated herein, a positive face template is a face template that has been confirmed as corresponding to a correctly matched image.

As indicated herein, system 102 associate one or more face templates with a particular user, where the templates may include positive face templates and negative face templates. Also, system 102 generates a face model for each user, where the face model is based on one or more positive face templates, and my also be based on one or more negative face templates. Example implementations are described in more detail below.

In an example scenario, a user Leo has an associated image with particular features. Leo has a rather green complexion to his skin. His eyes are particularly bulbous, and he has a turtle-esque smile. He wears a blue mask with slits for his eyes over his face often to disguise his identity, but in general, his smile, skin tone, and eyes are easy to recognize. In this example scenario, Leo has three friends that look eerily like him. Michael, Ralph, and Don. They all have the same green complexion, bulbous eyes, and turtle-esque smiles. They do wear masks similar to Leo's blue mask, yet different colors (e.g., orange, red, and purple masks). The distinguishing features are the colors of the masks.

Absent the implementations described herein, Leo, Michael, Ralph, and Don often receive alerts for each other, because images of their faces generally confuse facial recognition algorithms, as facial recognition algorithms typically weight smile, skin tone, and eyes heavily, whereas the color of the masks is weighted less or not at all. A problem with such conventional facial recognition algorithms is that, in the scenario described above, false positives occur. For example, the recognition algorithm may determine that Leo is shown on a photo that actually shows Michael. Implementations described herein minimize or avoid such false positives. Because system 102 applies the implementations described herein, when system 102 flags a photo of Michael and tags the photo as Leo, any user (such as Michael or Leo) can object by indicating that photo incorrectly tagged. System 102 then flags the template corresponding to the mismatched image as a negative template.

System 102 stores the negative template with a face model associated with Leo to be applied to future comparisons/matching processes. Accordingly, the next time an image of Michael is tagged or flagged as potentially being of Leo, system 102 uses the negative template as a reference to verify the potential match. In various implementations, system 102 balances the positive templates with the negative templates in order to make the matching process much more accurate.

In some implementations, system 102 stores the negative face template. In some implementations, the negative face template provides a negative weight during a matching process. In some implementations, system 102 identifies unique features in the negative face template for future matching.

System 102 may find a face, extract features, and make a template out of the features. System 102 may compare the template to various models, and match the template to the closest model. System 102 may then provide the template to the user and suggest the tag corresponding to the matched model. The user may then confirm whether the tag is correct. In some implementations, if the tag is confirmed as correct, system 102 flags the template as a positive template and adds the positive template to the face model. In some implementations, if the tag is not confirmed as correct (indicated as incorrect), system 102 flags the template as a negative template and stores the negative template with the face model.

In some implementations, system 102 may apply a similarity metric to compare the positive templates to the negative template. System 102 then measures the distance between the different templates. The differences among the positive templates will be smaller than those differences between the positive templates and the negative template.

The positive face templates provide a positive weight and the negative face templates provide a negative weight. In various scenarios, when there is an ambiguity between faces in different images (between templates), the negative template will help to tilt the scale appropriately. For example, any unique features associated with a particular face will be implicitly and/or explicitly incorporated into the template corresponding to the particular face. This template is a positive template for the face that it corresponds to and may be a negative template for other people's faces that look very similar but differ in one or more unique features. Negative templates may carry a significant amount of weight to cause the recognition to not trigger for other people's faces.

In some implementations, system 102 first marks or tags a given image as a particular person based on the matching process. System 102 then uses the negative template to verify if the decision was correct. For example, for verification, system 102 may compare the template associated with the image to the negative template. If the template associated with the image matches the negative template (e.g., is closer to the negative template), system 102 removes the mark or tag. In some implementations, system 102 may match the unique features of the negative template to the template corresponding to the new image.

Although the steps, operations, or computations may be presented in a specific order, the order may be changed in particular implementations. Other orderings of the steps are possible, depending on the particular implementation. In some particular implementations, multiple steps shown as sequential in this specification may be performed at the same time. Also, some implementations may not have all of the steps shown and/or may have other steps instead of, or in addition to, those shown herein.

While system 102 is described as performing the steps as described in the implementations herein, any suitable component or combination of components of system 102 or any suitable processor or processors associated with system 102 may perform the steps described.

In various implementations, system 102 may utilize a variety of recognition algorithms to recognize faces, landmarks, objects, etc. in images. Such recognition algorithms may be integral to system 102. System 102 may also access recognition algorithms provided by software that is external to system 102 and that system 102 accesses.

In various implementations, system 102 enables users of the social network system to specify and/or consent to the use of personal information, which may include system 102 using their faces in images or using their identity information in recognizing people identified in images. For example, system 102 may provide users with multiple selections directed to specifying and/or consenting to the use of personal information. For example, selections with regard to specifying and/or consenting may be associated with individual images, all images, individual photo albums, all photo albums, etc. The selections may be implemented in a variety of ways. For example, system 102 may cause buttons or check boxes to be displayed next to various selections. In some implementations, system 102 enables users of the social network to specify and/or consent to the use of using their images for facial recognition in general. Example implementations for recognizing faces and other objects are described in more detail below.

In situations in which the systems discussed here collect personal information about users, or may make use of personal information, the users may be provided with an opportunity to control whether programs or features collect user information (e.g., information about a user's social network, social actions or activities, profession, a user's preferences, or a user's current location), or to control whether and/or how to receive content from the content server that may be more relevant to the user. In addition, certain data may be treated in one or more ways before it is stored or used, so that personally identifiable information is removed. For example, a user's identity may be treated so that no personally identifiable information can be determined for the user, or a user's geographic location may be generalized where location information is obtained (such as to a city, ZIP code, or state level), so that a particular location of a user cannot be determined. Thus, the user may have control over how information is collected about the user and used by a content server.

In various implementations, system 102 obtains reference images of users of the social network system, where each reference image includes an image of a face that is associated with a known user. The user is known, in that system 102 has the user's identity information such as the user's name and other profile information. In some implementations, a reference image may be, for example, a profile image that the user has uploaded. In some implementations, a reference image may be based on a composite of a group of reference images.

In some implementations, to recognize a face in an image, system 102 may compare the face (e.g., image of the face) and match the face to reference images of users of the social network system. Note that the term "face" and the phrase "image of the face" are used interchangeably. For ease of illustration, the recognition of one face is described in some of the example implementations described herein. These implementations may also apply to each face of multiple faces to be recognized.

In some implementations, system 102 may search reference images in order to identify any one or more reference images that are similar to the face in the image. In some implementations, for a given reference image, system 102 may extract features from the image of the face in an image for analysis, and then compare those features to those of one or more reference images. For example, system 102 may analyze the relative position, size, and/or shape of facial features such as eyes, nose, cheekbones, mouth, jaw, etc. In some implementations, system 102 may use data gathered from the analysis to match the face in the image to one more reference images with matching or similar features. In some implementations, system 102 may normalize multiple reference images, and compress face data from those images into a composite representation having information (e.g., facial feature data), and then compare the face in the image to the composite representation for facial recognition.

In some scenarios, the face in the image may be similar to multiple reference images associated with the same user. As such, there would be a high probability that the person associated with the face in the image is the same person associated with the reference images.

In some scenarios, the face in the image may be similar to multiple reference images associated with different users. As such, there would be a moderately high yet decreased probability that the person in the image matches any given person associated with the reference images. To handle such a situation, system 102 may use various types of facial recognition algorithms to narrow the possibilities, ideally down to one best candidate.

For example, in some implementations, to facilitate in facial recognition, system 102 may use geometric facial recognition algorithms, which are based on feature discrimination. System 102 may also use photometric algorithms, which are based on a statistical approach that distills a facial feature into values for comparison. A combination of the geometric and photometric approaches could also be used when comparing the face in the image to one or more references.

Other facial recognition algorithms may be used. For example, system 102 may use facial recognition algorithms that use one or more of principal component analysis, linear discriminate analysis, elastic bunch graph matching, hidden Markov models, and dynamic link matching. It will be appreciated that system 102 may use other known or later developed facial recognition algorithms, techniques, and/or systems.

In some implementations, system 102 may generate an output indicating a likelihood (or probability) that the face in the image matches a given reference image. In some implementations, the output may be represented as a metric (or numerical value) such as a percentage associated with the confidence that the face in the image matches a given reference image. For example, a value of 1.0 may represent 100% confidence of a match. This could occur, for example, when compared images are identical or nearly identical. The value could be lower, for example 0.5 when there is a 50% chance of a match. Other types of outputs are possible. For example, in some implementations, the output may be a confidence score for matching.

Implementations described herein provide various benefits. For example, implementations described herein facilitate tagging of images for users. Implementations described herein also provide increasingly accurate tagging of images in a social networking environment. This is because conventional recognition algorithms that do not include the implementations described herein may wrongfully detect, based on the positive templates of an original person, a match of the original person in an image that actually shows another person that looks similar to the original person. Such an erroneous match may be referred to as a false positive. In order to reduce or avoid such false positives, algorithms may increase the confidence value required to determine a match. This has the consequence, however, that for some images that show the original person, the confidence value generated by the recognition may not be high enough to determine a match. Such a mismatch may be referred to as a false negative. Conventional recognition algorithms that do not include the implementations described herein and that determine matching solely based on a confidence threshold suffer from the above dilemma (e.g., false positives or false negatives), which leads to low accuracy in the tagging. In contrast, implementations described herein first determine a match using positive face templates and then use negative templates to verify the decision (e.g., whether the match was correct). Thus, implementations described herein balance positive and negative templates in order to increase tagging accuracy.

Figure 3:
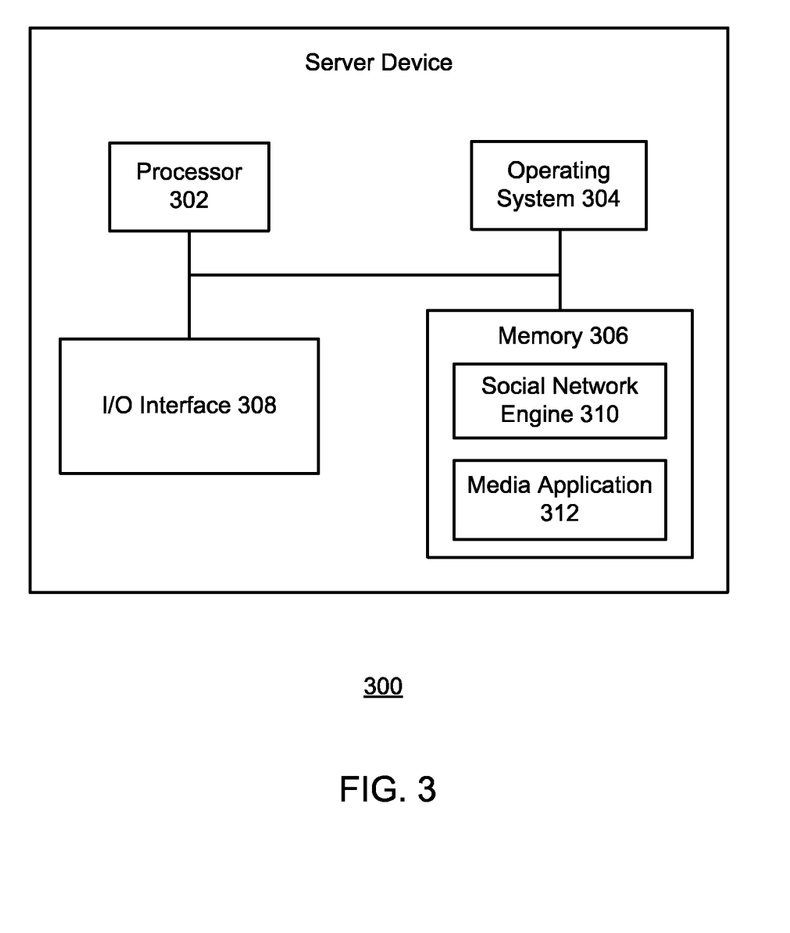
FIG. 3 illustrates a block diagram of an example server device, which may be used to implement the implementations described herein.

FIG. 3 illustrates a block diagram of an example server device 300, which may be used to implement the implementations described herein. For example, server device 300 may be used to implement server device 104 of FIG. 1, as well as to perform the method implementations described herein. In some implementations, server device 300 includes a processor 302, an operating system 304, a memory 306, and an input/output (I/O) interface 308. Server device 300 also includes a social network engine 310 and a media application 312, which may be stored in memory 306 or on any other suitable storage location or computer-readable medium. Media application 312 provides instructions that enable processor 302 to perform the functions described herein and other functions.

For ease of illustration, FIG. 3 shows one block for each of processor 302, operating system 304, memory 306, I/O interface 308, social network engine 310, and media application 312. These blocks 302, 304, 306, 308, 310, and 312 may represent multiple processors, operating systems, memories, I/O interfaces, social network engines, and media applications. In other implementations, server device 300 may not have all of the components shown and/or may have other elements including other types of elements instead of, or in addition to, those shown herein.

Although the description has been described with respect to particular embodiments thereof, these particular embodiments are merely illustrative, and not restrictive. Concepts illustrated in the examples may be applied to other examples and implementations. For example, some implementations are described herein in the context of a social network system. However, all implementations described herein may apply in contexts other than a social network. For example, implementations may apply locally for an individual user. Implementations may enable a user to tag other people in his/her photos. Implementations may enable a user to specify positive examples (e.g., positive templates, etc.) and remove negative examples (e.g., negative templates, etc.).

Note that the functional blocks, methods, devices, and systems described in the present disclosure may be integrated or divided into different combinations of systems, devices, and functional blocks as would be known to those skilled in the art.

Any suitable programming languages and programming techniques may be used to implement the routines of particular embodiments. Different programming techniques may be employed such as procedural or object-oriented. The routines may execute on a single processing device or multiple processors. Although the steps, operations, or computations may be presented in a specific order, the order may be changed in different particular embodiments. In some particular embodiments, multiple steps shown as sequential in this specification may be performed at the same time.

A "processor" includes any suitable hardware and/or software system, mechanism or component that processes data, signals or other information. A processor may include a system with a general-purpose central processing unit, multiple processing units, dedicated circuitry for achieving functionality, or other systems. Processing need not be limited to a geographic location, or have temporal limitations. For example, a processor may perform its functions in "real-time," "offline," in a "batch mode," etc. Portions of processing may be performed at different times and at different locations, by different (or the same) processing systems. A computer may be any processor in communication with a memory. The memory may be any suitable processor-readable storage medium, such as random-access memory (RAM), read-only memory (ROM), magnetic or optical disk, or other tangible media suitable for storing instructions for execution by the processor.

What is claimed is:

1. A computer-implemented method comprising:
generating a target face template corresponding to a target face in a target image, wherein the target face template includes at least one indication of at least one facial feature of the target face;
retrieving from a storage device, a face model for a face of a user, wherein the face model includes at least one model indication of one or more model facial features of the face of the user, and wherein the at least one model indication is associated with reference facial features of a plurality of positive face templates generated from a first set of images previously verified to depict the user;
determining a match of the at least one indication of the at least one facial feature of the target face template with the at least one model indication;
in response to determining the match, associating a tag with the target image, wherein the tag identifies the target face as the user;
retrieving from the storage device, one or more negative face templates generated from a second set of images having one or more faces previously verified to not be the user, wherein the one or more negative face templates include at least one indication of one or more differentiating facial features;
determining whether the tag correctly identifies the target face as the user, based on comparing the at least one indication of the at least one facial feature of the target face template with the at least one indication of the one or more differentiating facial features of the one or more negative face templates; and
in response to determining the tag correctly identifies the target face as the user, transmitting the target image and the tag to a computing device through a data communication network.

2. The method of claim 1, further comprising,
providing to a device, one or more test images;
receiving, by the device, user input that indicates that one or more images of the one or more test images are one or more mismatched images that do not depict the user; and
designating one or more face templates that correspond to the one or more mismatched images as the one or more negative face templates.

3. The method of claim 1, wherein determining whether the tag correctly identifies the target face as the user includes determining that the target image does not depict the user based on the target face template based on a level of similarity between the target face template and at least one of the one or more negative face templates being greater than a level of similarity between the target face template and the face model.

4. The method of claim 1, wherein determining whether the tag correctly identifies the target face as the user includes determining that the target image depicts the user based on the target face template corresponding to the target image based on a level of similarity between the target face template and at least one of the one or more negative face templates being less than a level of similarity between the target face template and the face model.

5. The method of claim 4, further comprising, in response to determining that the tag correctly identifies the target face as the user, updating the face model with the target face template corresponding to the target image.

6. The method of claim 1, further comprising:
receiving, from a device, user input that indicates that the target image is a mismatched image that does not depict the user.

7. The method of claim 1, further comprising:
receiving, from a device, user input that indicates that the target image is a correctly matched image that depicts the user.

8. The method of claim 1, wherein determining whether the tag correctly identifies the target face as the user includes:
determining the one or more differentiating characteristics that differentiate the one or more negative face templates from the plurality of positive face templates; and
determining that the target face template includes at least one differentiating characteristic of the one or more differentiating characteristics indicating that the target image does not depict the user.

9. The method of claim 8 wherein the one or more differentiating characteristics include at least one of:
one or more facial features in the one or more negative face templates or in the plurality of positive face templates, and
one or more colors provided in the face described by the facial features.

10. The method of claim 1,
wherein determining whether the tag correctly identifies the target face as the user includes providing a negative weight for the determining based on the one or more differentiating facial features in the target image that do not match the face of the user.

11. The method of claim 1, wherein the target face template corresponding to the target image describes at least one of:
a location of the target face within the target image, and
one or more distances between a plurality of facial features of the face.

12. A system comprising:
one or more processors; and
logic encoded in one or more non-transitory tangible media for execution by the one or more processors and when executed operable to perform operations comprising:
generating a plurality of face templates corresponding to respective images, wherein each face template of the plurality of face templates includes a description of each of facial features of a face depicted in a corresponding one of the respective images and a value for each of the facial features;
matching the respective images to a user identity of a user by determining similarities of at least one of the facial features to one or more reference facial features in one or more reference images that depict the user;
determining that at least one image of the respective images is at least one mismatched image that does not depict the user associated with the user identity, wherein the at least one mismatched image includes one more differentiating facial features, and wherein the determining is based on first received user input;
designating at least one face template corresponding to the at least one mismatched image as at least one negative face template, wherein the at least one face template includes a value for each of the one or more differentiating facial features;
generating a face model for the user based on combining the values of the facial features of one or more face templates of the plurality face templates that are not the at least one negative face template;
using the face model to determine whether a target image is matched to the user identity of the user associated with the face model;
verifying whether the target image is matched to the user identity by determining whether the target image includes the one or more differentiating facial features; and
in response to verifying the target image is matched to the user identity, transmitting the target image and at least one tag associated with the user identity, to a computing device through a data communication network.

13. The system of claim 12, wherein the logic when executed by the one or more processors is operable to perform further operation comprising:
determining, based on second received user input, that one or more of the matched respective images are one or more correctly matched images that depict the user of the user identity; and
designating one or more face templates corresponding to the one or more correctly matched images as one or more positive face templates, wherein the face model is generated based on the one or more positive face templates.

14. The system of claim 12, wherein the operation of using the at least one negative face template to verify whether the target image is matched to the user identity includes verifying whether the target image includes the one or more differentiating facial features that are indicated by the at least one negative face template.

15. The system of claim 14, wherein the logic when executed is further operable to perform operations comprising:
in response to determining that the target image is matched to the user identity, determining the one or more tags in association with the target image, wherein the one or more tags identify the user; and
in response to verifying that the target image is not matched to the user identity, removing the one or more tags from association with the target image.

16. The system of claim 12, wherein the logic when executed is further operable to perform operations comprising, in response to verifying that the target image is matched to the user identity, updating the face model with one or more face templates generated from the target image.

17. The system of claim 12, wherein the operation of using the at least one negative face template includes determining whether a level of similarity between the target image and at least one of the one or more negative face templates are greater than a level of similarity between the target image and the face model.

18. The system of claim 12, wherein
the one or more differentiating characteristics include at least one of:
one or more facial features in the at least one negative face template or in the face templates corresponding to the respective images that are not determined as the at least one mismatched image, and
one or more colors provided in the face described by the facial features; and
determining that one or more target face templates generated from the target image includes one or more of the one or more differentiating characteristics to verify that the target image is not matched to the user identity.

19. A non-transitory computer-readable storage medium having stored thereon software instructions that, when executed by a processor, cause the processor to perform operations including:
- generating a target face template corresponding to a target face in a target image, wherein the target face template includes at least one indication of at least one facial feature of the target face;
- retrieving from a storage device, a face model for a face of a user, wherein the face model includes at least one model indication of one or more model facial features of the face of the user, and wherein the at least one model indication is associated with reference facial features of a plurality of positive face templates generated from a first set of images previously verified to depict the user;
- determining a match of the at least one indication of the at least one facial feature of the target face template with the at least one model indication;
- in response to determining the match, associating a tag with the target image wherein the tag identifies the target face as the user;
- retrieving from the storage device, one or more negative face templates generated from a second set of images having one or more faces previously verified to not be the user, wherein the one or more negative face templates include at least one indication of one or more differentiating facial features;
- comparing the at least one indication of the at least one facial feature of the target face with the at least one indication of the one or more differentiating facial features of the one or more negative face templates;
- determining whether the tag correctly identifies the target face as the user based on comparing the at least one indication of the at least one facial feature of the target image with the one or more differentiating facial features of the one or more negative face templates; and
- in response to determining the tag correctly identifies the target face as the user, transmitting the image and the tag to a computing device through a data communication network.

20. The non-transitory computer-readable storage medium of claim 19 wherein determining whether the tag correctly identifies the target face as the user includes determining whether the indication of the at least one facial feature in the target face template is more similar to the at least one indication of the one or more differentiating facial features of at least one of the one or more negative face templates than to the at least one model indication of one or more of the model facial features of the face model.

* * * * *